No. 835,226. PATENTED NOV. 6, 1906.
W. W. OAKES.
SAW.
APPLICATION FILED JULY 16, 1903.
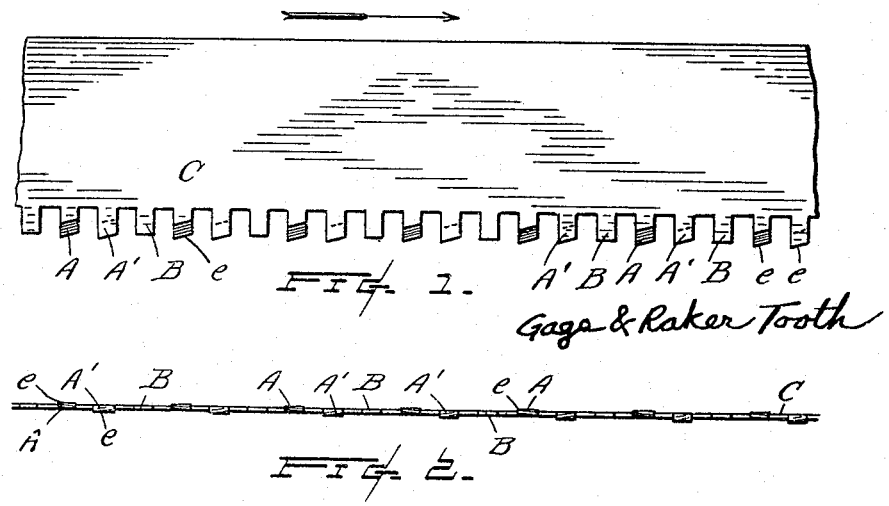
WITNESSES:
J. W. Th. Olain.
Ross W Tulloch
INVENTOR
Wm W. Oakes
BY
Pierre Barnes
ATTORNEY

UNITED STATES PATENT OFFICE.

WILLIAM WALLACE OAKES, OF SEATTLE, WASHINGTON, ASSIGNOR OF TWO-THIRDS TO ALBERT E. BRAYMER, OF SEATTLE, WASHINGTON.

SAW.

No. 835,226.    Specification of Letters Patent.    Patented Nov. 6, 1906.

Application filed July 16, 1903. Serial No. 165,769.

*To all whom it may concern:*

Be it known that I, WILLIAM WALLACE OAKES, a citizen of the United States, residing at Seattle, in the county of King and State of Washington, have invented certain new and useful Improvements in Saws, of which the following is a specification, reference being had therein to the accompanying drawings.

This invention relates to saws; and its object is to provide a saw of simple form which will be easy to operate and keep in condition and which will make a cut sufficiently smooth to require no further manipulation thereupon by a planer or the like.

The invention consists in the novel form and combination of the saw-teeth, as will be hereinafter described, and illustrated in the accompanying drawings, in which—

Figure 1 is an elevation of a portion of a saw-blade embodying my invention. Fig. 2 is an edge or plan view of the same.

The teeth of the saw are arranged in groups, each group comprising two cutting-teeth A A' and a gage and raker-tooth B. The cutting-teeth are severally provided with a single cutting edge $e$, which are all inclined in the same direction lengthwise of the saw, but filed so as to alternately slope from and present the cutting edge upon opposite sides of the blade. The said cutting edges are inclined longitudinally, but little out of the horizontal, when the saw is held level, and consequently they sever the grain of the wood being sawed by an incisive and not a chisel cut.

The intermediate teeth B are made rectangular, or nearly so, in longitudinal and cross sections and are of a depth from the blade C slightly less than the extreme depth of the cutting-teeth for the purpose of providing a support to bear against the bottom of the saw-kerf and regulate the amount of cut made by each forward stroke of the saw. This function is particularly advantageous in cutting the softer varieties of wood, as it prevents the saw-teeth being buried too deeply and tearing the wood fibers.

In operation with reciprocating or hand saws the cutting would always be done on the forward stroke of the saw, or in the direction indicated by the arrow in Fig. 1, and the saw would ordinarily be raised slightly on the reverse stroke.

It may be mentioned that by limiting the depth of the individual cuts, as is done by the introduction of the gage-teeth, that the cut is not only made smoother, but the tendency to "run" or swerve from a plane is reduced to a minimum, and the cutting-teeth which are formed and arranged according to this invention will require no setting other than is made by the side pressure received from the file in sharpening.

Having described my invention, what I claim as new, and desire to secure by Letters Patent, is—

A straight-edge saw having cutting-teeth arranged in groups of two teeth, both the front and rear edges of each tooth being at right angles to the edge of the saw, the teeth of each group being beveled at reverse angles one to the other and reversely set, the beveled surfaces of said teeth being at an angle to the straight edge of the saw longitudinally of said edge and the sharp edges of all the cutting-teeth being inclined in the same direction, the saw having gage-teeth alternating with the groups of cutting-teeth, the front and rear edges of said gage-teeth being disposed at right angles to the blade of the saw and having blunt edges parallel with the edges of the blade.

In testimony whereof I affix my signature in presence of two witnesses.

WILLIAM WALLACE OAKES.

Witnesses:
   P. C. DORMITZER,
   O. G. EHSSEGREN.